United States Patent [19]

Nussbaumer et al.

[11] Patent Number: 4,840,095
[45] Date of Patent: Jun. 20, 1989

[54] TURNING MACHINE

[75] Inventors: Walter Nussbaumer; Karl-Heinz Beyrer, both of Ravenburg, Fed. Rep. of Germany

[73] Assignee: Maschinenfabrik Ravensburg AG, Ravensburg, Fed. Rep. of Germany

[21] Appl. No.: 60,076

[22] Filed: Jun. 9, 1987

[30] Foreign Application Priority Data

Jun. 9, 1986 [DE] Fed. Rep. of Germany ....... 3618938

[51] Int. Cl.$^4$ ............................................. B23B 3/00
[52] U.S. Cl. ........................................ 82/117; 82/15;
 82/142; 82/149; 82/137; 29/27 C
[58] Field of Search ..................... 82/2 R, 28 R, 28 B,
 82/2 D, 12, 32, 24 R, 15, 16, 17; 51/124 R, 124
 L, 97 R; 29/27 C, 27 R, 27 A, 28

[56] References Cited

U.S. PATENT DOCUMENTS

| 117,513 | 8/1871 | Chormann ......................... 82/24 R |
| 2,470,871 | 5/1949 | Schwantes . |
| 2,589,488 | 3/1952 | Fowler ............................... 51/124 L |
| 4,706,373 | 11/1987 | Andriussi ............................. 408/35 |

FOREIGN PATENT DOCUMENTS

| 202420 | 3/1959 | Austria . |
| 845592 | 8/1952 | Fed. Rep. of Germany . |
| 2149461 | 4/1972 | Fed. Rep. of Germany . |
| 3410276 | 10/1984 | Fed. Rep. of Germany . |
| 1202198 | 10/1960 | France . |
| 85/04126 | 9/1985 | PCT Int'l Appl. . |
| 1554627 | 10/1979 | United Kingdom . |

OTHER PUBLICATIONS

Von Willy Kalmbach, "CNC–Drehmaschine als Bearbeitungszentrum," *Werkstatt und Betrieb* 111 (1978), No. 8, pp. 501–504.

Von Dr.-Ing. Karl-Peter Sorge, Weiterstadt, "Komplettbearbeiten durch Drehfrasen," *Werkstatt und Betrieb* 117 (1984), No. 1, pp. 37–39.

*Primary Examiner*—James G. Smith
*Assistant Examiner*—Lawrence Cruz
*Attorney, Agent, or Firm*—Spencer & Frank

[57] ABSTRACT

A turning machine which is used preferably for machining spatially complicated shapes. In order to achieve further machining possibilities, apart from the known adjusting possibilities and machining possibilities by means of a universal rest, the spindle head, alternatively or in addition hereto, is mounted on a machine bed in a longitudinally displaceable manner, if necessary in a transversely displaceable manner, an in a swivelable or rotatable manner.

13 Claims, 4 Drawing Sheets

TURNING MACHINE

BACKGROUND OF THE INVENTION

The invention relates to a turning machine having a multiple track bed, a spindle head with a drive device for a work mount, and a rest, preferably designed as a compound slide or machining turret, for mounting tools or driveable machining units.

The turning machines previously comprising a two-track machine bed having a spindle head for work mounting, a tailstock as a counterstay, and also a rest as a tool-holder have now been further developed into high-production turning machines or high-production machining centers. The two-track bed has been further developed into a three-track bed or a four-track bed for independently moving the rest relative to the other parts of the turning machine. In particular, the rest has been extensively developed further as a machining center or a universal tool holder having separate drive devices for tool mounting or complete machining units. Apart from fixed turning tools, driven machining units for grinding, milling and boring are therefore fixed on the rest (DE-A No. 1-34 10 276).

In these known machining centers, the rest, apart from executing the known motion ($X_1$-axis) transversely to the longitudinal axis of the machine bed by means of a compound slide on a separate carriage (four-track bed), also executes a separate longitudinal motion (Z-axis) parallel to the longitudinal axis of the machine bed. In addition to this cross motion in a horizontal plane, the rest can execute a motion in a vertical axis (Y-axis) and also a rotary motion about this vertical axis (B-axis). With a numerically controlled drive, turning machines of this type can be used as universal metal-cutting machines.

In these known metal-cutting machines, the spindle head is essentially used for mounting the workpiece, with the spindle executing the rotary motion (C-axis) about the longitudinal axis of the workpiece. In this connection, it is known to carry out the rotary motion of the spindle of the spindle head in preset angular steps.

The known universal turning machines have the disadvantage that on the one hand all possibilities of optimally machining a workpiece are hereby not yet exhausted. On the other hand, it is disadvantageous that the rest assumes spatial motion sequences for which it is not necessarily suitable. If, for example, it is desired to produce a tapered circumference on the workpiece, the rest can only achieve this by moving outward gradually in the transverse direction (X-axis). During this procedure, it is not always guaranteed that the cutting tool is always perpendicular to the cutting surface, i.e. the angle of contact does not correspond to the surface normals.

In the known universal machining centers, it can also be of disadvantage that the rest described, which is of complicated construction, as a machining turret has to be of very elaborate design so that the requisite spatial motion sequences can be executed, not least also in combination with a very complicated numerical control system. Because of the guides for the drive units of the rest, which guides are arranged in the most restricted construction space, the machining accuracy can only be produced by maximum precision of the components, with the rigidity and stability of the system of the rest leaving something to be desired.

SUMMARY OF THE INVENTION

The object of the invention is to remove the above-mentioned disadvantages and in particular to develop a turning machine which can execute further suitable motion sequences for the spatial machining of workpieces.

Based on a turning machine according to the generic term, this object is achieved by providing a turning machine on which the spindle head is swivelably or rotatably mounted on a separate spindle head machine bed for executing a longitudinal motion in the direction of the longitudinal axis of the spindle head machine bed and in a horizontal plane about a vertical swivel or rotation axis.

The invention is based upon the knowledge that the previous relative immobility of the spindle head, with merely the rotary motion of the spindle about the C-axis, is of disadvantage.

According to the invention, therefore, the motion sequences typical of the rest are partly or completely transmitted to the spindle head itself. Of particular importance in this connection is the practicable longitudinal motion of the spindle head in the direction of the longitudinal axis of the machine bed (W-axis). According to the invention, a transverse motion is superimposed on this longitudinal motion in the same horizontal plane, with it being possible for the transverse motion to be executed on a straight line ($X_2$-axis), for example by means of a compound slide, or on a curve ($B_1$-axis).

A number of advantages in the machining of workpieces are connected with the combined longitudinal motion (W-axis) and swivel motion ($B_1$-axis) of the spindle head in a horizontal plane. If, for example, it is desired to produce a tapered circumferential surface, the spindle head need only be swivelled through the angle which the tapered circumferential surface encloses with the rotational axis of the workpiece. In this way, the tapered circumferential surface to be machined is positioned parallel to the longitudinal axis of the main machine bed, so that the rest need only execute a longitudinal motion in the Z-axis, i.e. parallel to the longitudinal axis of the machine bed, but not an infeed motion in the X-axis or rotary motion in the $B_2$-axis. The rest can therefore be of exceptionally simple construction for this machining, with a control system for the rest for producing the tapered circumferential surface being dispensed with completely.

Moreover, an advantage here is that the setting angle of the cutting tool to the workpiece surface, even in the case of these curved surfaces, can always be kept constant. This is especially important in the case of tools with line contact, such as, for example, profiled cutting tools, grinding wheels, roller-burnishing devices, milling cutters, etc., or when using measuring sensors.

However, as a result of the inventive swivel device of the spindle head, the rest can also be made substantially more robust as a tool holder, for example for boring rods, grinding spindles, etc., since the workpiece opening available, for example in machining internal contours, can be better utilized as a result of the constant angle of contact between the workpiece and the tool.

Compared with turning machines with turntables on the rest ($B_2$-axis), the present invention has the further advantage that the machining accuracy is substantially increased, since considerably more construction space is available for guides, a drive and measuring systems.

In this way, substantially greater rigidity can also be achieved.

Moreover, it is advantageous that the drive of the guideways and also the measuring systems, for executing the motion of the spindle head, are located outside the chip area and are therefore protected.

Since in the continuous machining of complicated surfaces, constant adjustment of the rest by numerical control can be dispensed with if necessary, the rigidity of the entire machine in the clamped condition of the swivel axis is not impaired. Internal and external tapers can therefore be produced exceptionally accurately in single-axis operation, since no interpolation errors occur outside by simultaneous traversing of two axes as in the conventional system. In this way, the machining units, such as grinding units, boring equipment, etc., can also be made more robust, since they are no longer impaired by the space requirement of a swivel axis on the rest.

Depending on the application, the rest can therefore be of very simple design even for producing very complicated parts, with a simple control unit being sufficient. However, the rest can of course also be designed in complicated embodiments as a universal tool holder with mounting fixtures for detachably fixing tools or driveable machining units having a numerical control system.

For producing complicated shapes, such as parabolic surfaces, hyperbolic surfaces and the like, the swivel motion and also the longitudinal and/or transverse motions of the spindle head can likewise be executed in numerically controlled manner. For this purpose, the requisite curve functions are transmitted to the infeed motion of the individual axes of the spindle head. This enables, for example, highly accurate parabolic bodies of ceramics, glass, plastic or high-strength steels to be ground, with a setting angle which is always constant of the cutting tool relative to the workpiece being ensured.

Moreover, the invention has the advantage that a greater dynamic range of the rest can be achieved provided that swivel drive is not arranged on the rest and therefore need not be accelerated or decelerated along with the rest.

It is also advantageous that existing alignment errors between the spindle head and the tailstock can easily be corrected by software so that no mechanical synchronizing work is necessary.

The turning machine according to the invention is preferably used as a universal turning machine with a rest as a machining center, with milling stations, internal and external grinding stations and boring stations being provided in addition to machining by turning. Moreover, diverse measuring stations for workpiece measurement can also be attached in an advantageous manner.

The swivel device of the spindle head can be designed in various ways.

As a first swivelling means, the swivel motion of the entire spindle head is considered about a vertical swivel axis which is preferably at a clear distance from the center of gravity S of the spindle head. In large metal-cutting machines this distance can be between one meter and three meters. This results in a large lever arm with a swivel drive adjustability which can be set correspondingly accurately. However, this distance can also be small.

Alternatively or in addition hereto, the swivel motion of the spindle head can be designed as a rotary motion and can be effected in such a way that the vertical rotation axis leads through the center of gravity of the spindle head or is located in the area of this center of gravity. This rotary motion is possible, for example, by means of a rotary table beneath the spindle head. This corresponds, for example, to a transmission of the known motion sequences in the rest to the spindle head, but not with surprising results connected therewith.

In the most complicated embodiment, the spindle head can accordingly execute motion sequences in the direction of the longitudinal axis of the machine head (W-axis) and transversely hereto ($X_2$-axis) by means of a compound slide and also a rotary motion ($B_1'$-axis) by means of a rotary table arranged on the compound table. Moreover, a swivel motion with a large swivel radius and therefore a large swivel angle can be effected ($B_1$-axis) via the additional swivel axis at a distance from the center of gravity of the spindle head.

Further advantages follow from the advantageous developments of the inventive turning machine according to the sub-claims.

BRIEF DESCRIPTION OF THE DRAWINGS

Exemplary embodiments of the invention are explained in greater detail in the description, with further advantages specified, and are shown in the drawing, in which.

DESCRIPTION OF THE PREFERRED EMBODIMENTS

Figure 1:
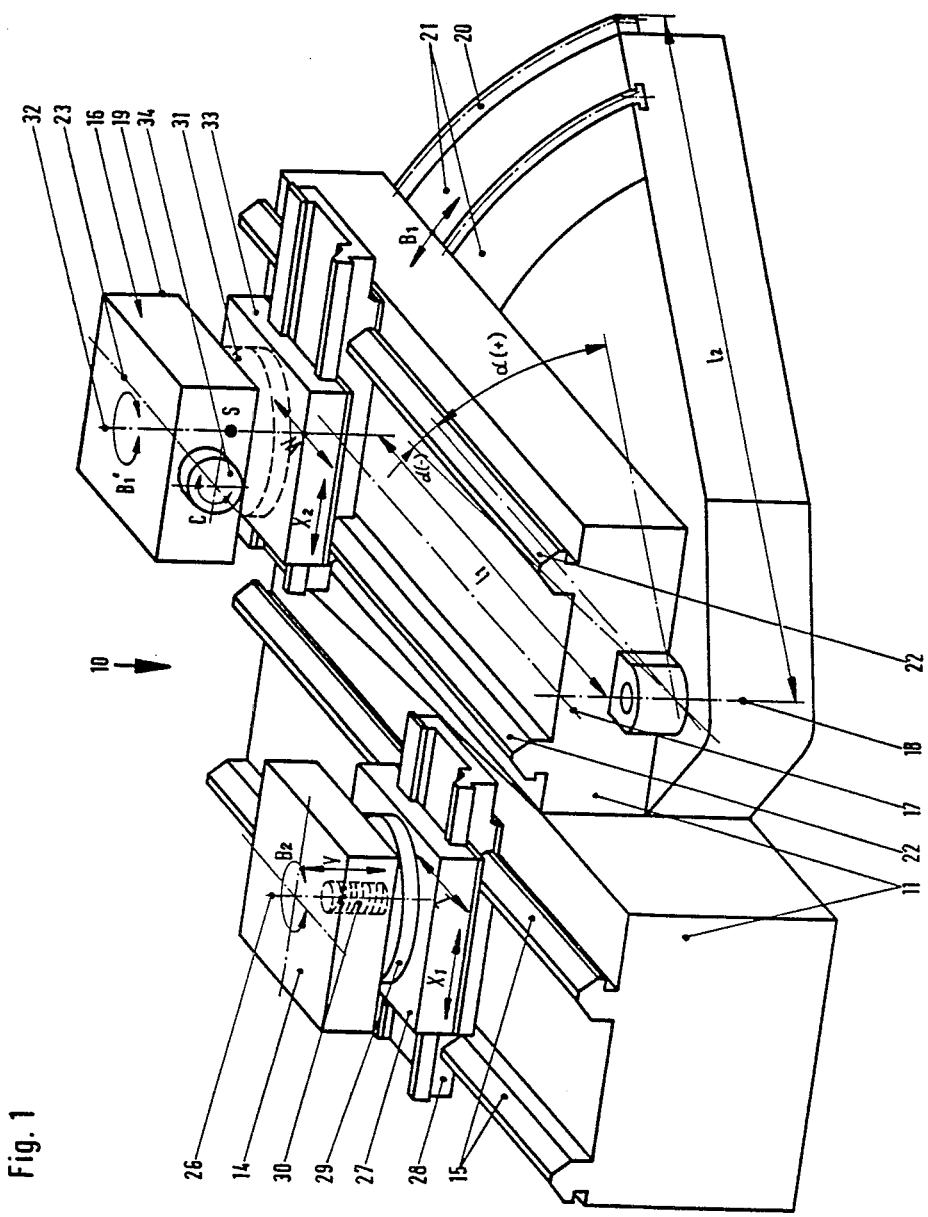
FIG. 1 shows a perspective representation of a turning machine according to the invention, indicating as many practicable functions as possible for representing the principle.
Figure 2:
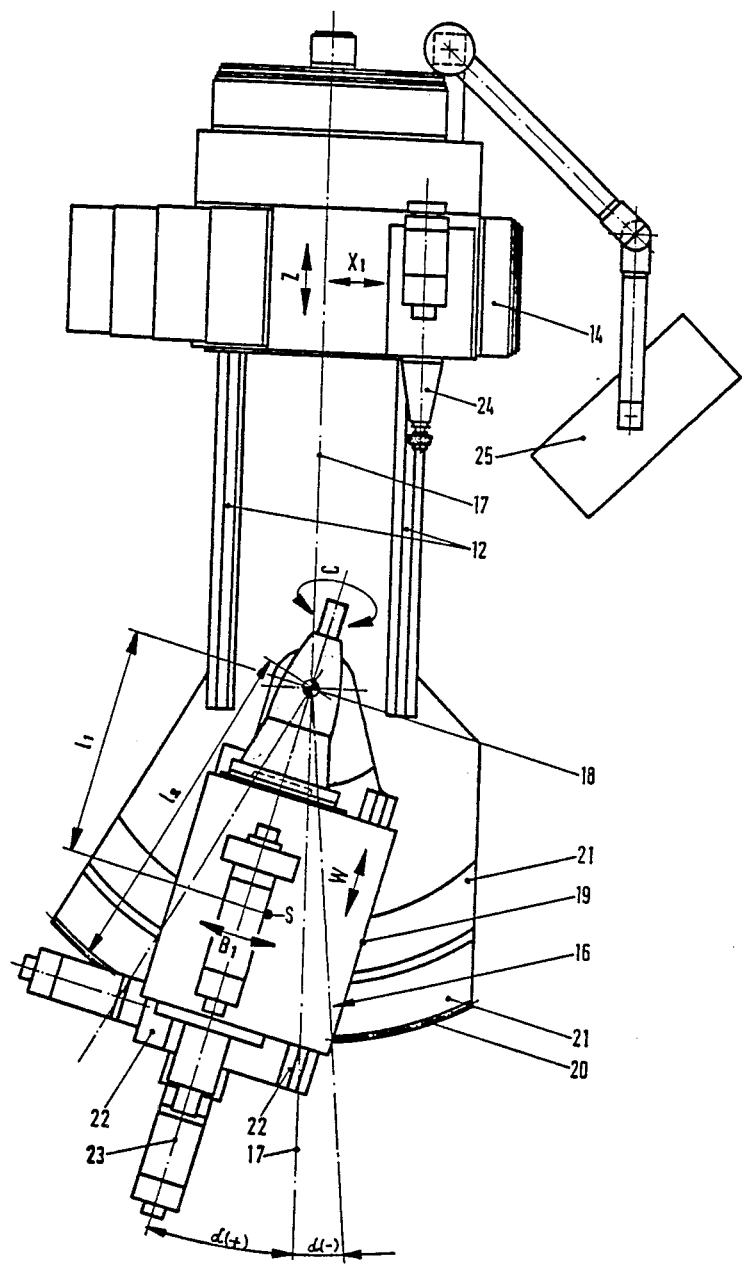
FIG. 2 shows a plan view of a simplified embodiment of a turning machine having a two-track bed according to the inventive principle, and FIG. 3, in plan view, shows a universal turning machine according to the inventive principle, having a four-track bed and a universal machining rest.
Figure 3:
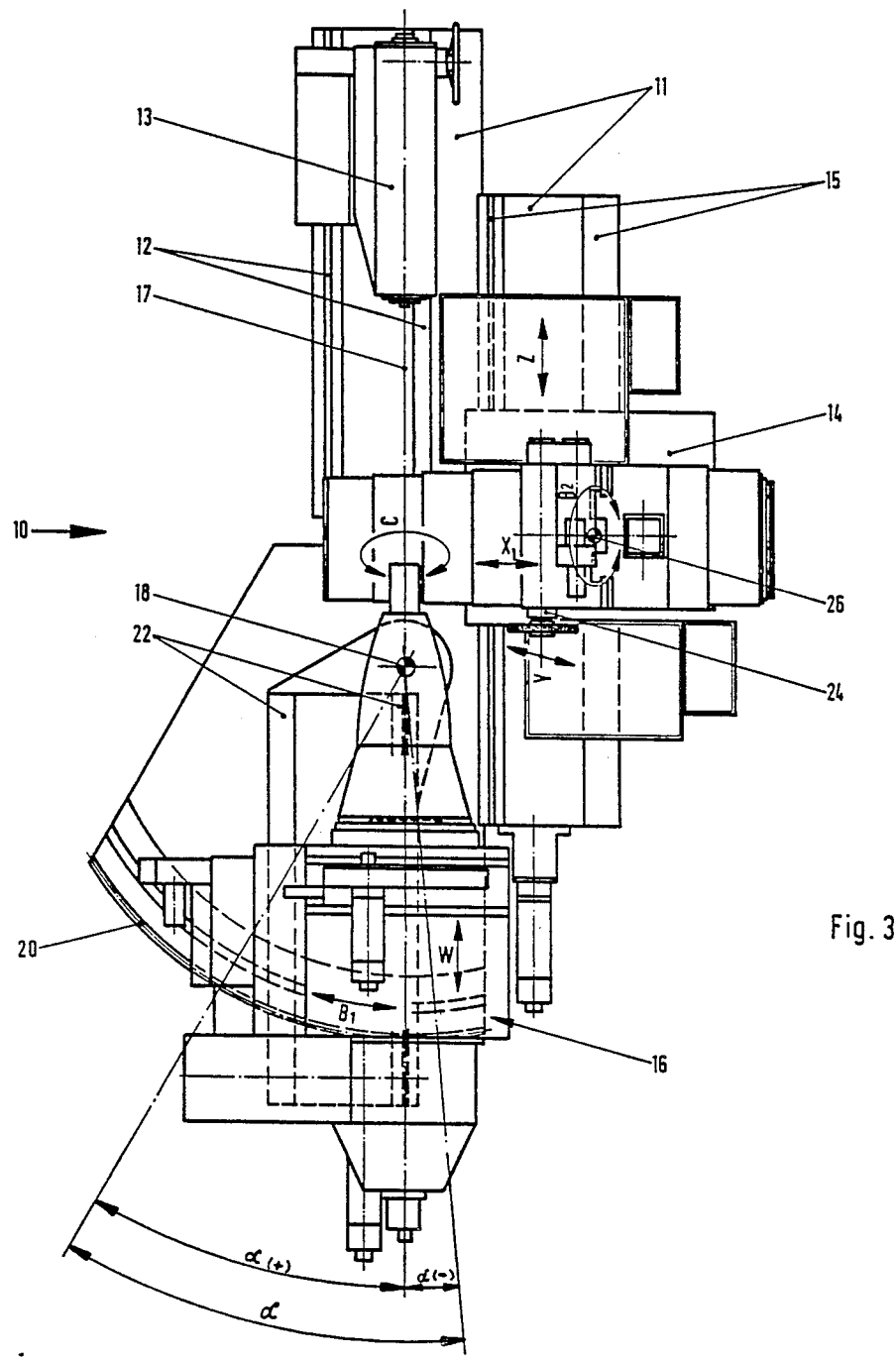

The turning machine (10) shown in FIGS. 1 to 3 is designed as a universal metal-cutting machine having a known four-track bed (11). The main machine bed (12) shown in FIGS. 2 and 3 in plan view is used for mounting the tailstock (13) or, in a simplified embodiment in FIG. 2, for mounting the rest (14) in the two-track bed. In the four-track bed, the auxiliary machine bed (15) is used for mounting the rest (14) which can be moved independently of the main machine bed.

In a first alternative embodiment, the special feature according to the invention is that the entire spindle head (16) is released relative to the main machine bed (12) and is made such that it can be swivelled ($B_1$-axis) relative to the longitudinal axis (17) of the latter and transverse longitudinally (W-axis) in the direction of its own longitudinal axis (23). This alternative solution is shown in FIGS. 1 to 3. According to this first alternative, the swivel motion is executed through the angle $\alpha$ about a vertical rotation axis (18) which is located at a distance $L_1 \gg$ zero from the center of gravity S of the spindle head (16) or of the headstock (19). Depending on the type of machine, this distance $L_1$ is in the order of magnitude of one meter to three meters. Accordingly, the entire spindle head (16) is swivelled outward relative to the longitudinal axis (17) of the main machine bed. The rack-and-pinion drive (20) with guides (21) is used for this purpose. So that the spindle head (16) can be swivelled relative to the main machine bed (12), the entire spindle head must therefore be released from the main machine bed (12), as can be particularly plainly seen from FIGS. 2 and 3. The spindle head (16) has a separate spindle-head machine bed (22) on which the headstock (19) is traversable in the direction of the longitudinal axis (W-axis) of the spindle head. Only if $\alpha = $ zero is the longitudinal axis (23) of the spindle head in alignment with the longitudinal axis (17) of the main machine bed, as shown in FIG. 3.

The displacement of the spindle head (16) relative to the zero position (in which the tracks 15 and 22 are parallel), when swivelled about the vertical rotation axis (18), is $\alpha \sim -10°$ to $+90°$ and preferably $\alpha \sim -5°$ to $+30°$. Preferably the spindle head (16), in the representation according to FIG. 1, can be swivelled out of the zero position clockwise through about 30° and anti-clockwise through about 5°, with the zero position being identified by aligned longitudinal axes (17 and 23) of the main machine bed and of the spindle head. This swivel motion is schematically shown in the figures as $\alpha_{(+)}$ and $\alpha_{(-)}$. The swivel motion about the vertical axis (18) is identified as movement along the $B_1$-axis. An especially accurate spindle guidance which is free from play can be achieved by the long lever arm $L_2$ between the swivel axis (18) and the swivel drive (20) (See FIG. 3). This horizontal swivel motion of the spindle head is effected by means of a pretensioned gear drive which is known per se and has automatic backlash compensation which acts on the rack-and-pinion drive (20). As is common practice, such structure allows the relative movement of the parts to be relatively free from play by means of a toothbar rack. This technology is known, for example, from the Siemens Literature "Elektrische Vorschubantriebe fur Werkzeugmaschinen" (Electric Feed Drives for Machine Tools), Verlag Siemens AG 1981, page 236 ff.

The embodiment described above is shown in principle in FIG. 1 and in alternative embodiments in FIGS. 2 and 3, with FIG. 2 showing a two-track bed and FIG. 3 showing a three-track bed. Basically, in both designs, the spindle head (16), about the vertical axis (18), is mounted such that it can swivel along the so-called $B_1$-axis and can be longitudinally traversed along the W-axis. FIG. 2 shows the spindle head (16) in a position displaced to one side through the angle $\alpha_{(+)}$ relative to the aligned longitudinal axis (17) of the main machine bed (12) or the zero position of the spindle head.

In a considerably simplified embodiment of the invention, the axial independent motion of the spindle head (16) (along the W-axis) can be dispensed with in special cases; i.e. only the inventive swivel motion of the spindle head (16) is executed, while the rest (14) on the main machine bed (12) executes the longitudinal motion (along the Z-axis) and also the transverse motion or feed motion (along the $X_1$-axis).

In FIGS. 2 and 3, the same construction of the spindle head (16) is shown in principle, i.e. the swivel motion is effected about the vertical axis (18) (along the $B_1$-axis), and the longitudinal motion on the spindle-head machine bed (22) made separate from the main machine bed (12) is effected along the W-axis. Also shown are the rack-and-pinion drive (20), at a distance $L_2$ from the rotation axis (18), and a guide (21).

Apart from the main machine bed (12), the embodiment according to FIG. 3, just as in FIG. 1, contains an auxiliary machine bed (15) for the rest (14). In FIG. 3, this rest is designed as a universal machining turret, with mounting fixtures for detachably fixing tools or driveable machining units. A grinding unit is shown as an example of a machining unit (24). The direction of motion of the rest is shown by the Z-axis parallel to the longitudinal axis (17) of the main machine bed (12), and the direction transversely hereto is shown by the $X_1$-axis. In addition, the rest can also execute a rotary motion about a vertical rotation axis (26), which is identified as motion along the $B_2$-axis. The vertical adjustability in the direction of the vertical rotation axis (26) is designated as "Y-axis". These directions of motion and degrees of freedom are also reproduced in FIG. 1 in the corresponding representation of the rest. A compound slide (27) or tool slide which runs on a cross slide (28) or the machine bed (15) assumes the motion in the horizontal plane (Z-axis and $X_1$-axis). A rotary table (29) assumes the rotary motion along the $B_2$-axis, while a lifting device (30), in a manner known per se, assumes the motion along the Y-axis, i.e. in the direction of the vertical rotation axis (26).

A simplified rest (14) with a grinding unit (24) and a numerical control unit (25) is shown in FIG. 2.

As an alternative embodiment or as a supplementary embodiment to the embodiments shown hitherto, in particular the embodiments according to FIGS. 2 and 3, a possibility is shown in FIG. 1 of producing the rotary motion of the spindle head (16) via a separate rotary table (31), with the rotation center axis (32) being guided through the center of gravity S or in the area of this center of gravity S of the headstock. In this way, the headstock (19) can execute a similar rotary motion (along the circular axis $B_1'$) as is executed by the rest as a result of the rotary table (29). In particular applications, this rotary motion can be a very suitable addition to the swivel motion about the rotation axis (18). In a particular embodiment of the device according to the invention, it can even be available on its own. The advantages mentioned at the beginning can likewise be partly achieved with this rotary device.

The invention according to the representation according to FIG. 1, in addition to providing the longitudinal motion in the direction of the W-axis, also provides for the possibility of a motion of the spindle head transverse thereto ($X_2$-axis). This is achieved by a separate compound table (33) which imparts a mobility to the spindle head as known per se hitherto only from the rest.

In FIGS. 1 to 3, the rotary motion of the spindle is shown with the C-axis. In this connection, the rotary motion can be executed in steps by an indexing control (dividing axis drive, not shown) with the setting of any angle or angular ranges of rotation of the spindle about the axis 23.

Figure 4:
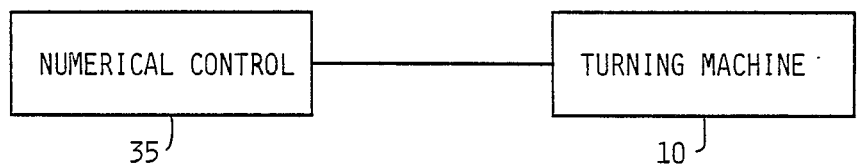
FIG. 4 schematically illustrates numerical control of movements of the spindle head and the rest.

The embodiment of the invention according to FIG. 1 represents in total and in principle the plurality of the possibilities according to the invention. Moreover, a determining factor is that, apart from the known mobility of the rest as a universal machining center with the motion axes $X_1$, Z, $B_2$ and Y, the spindle head can also execute a completely independent motion in the direction of the axes W and $X_2$ and of the swivel motion $B_1$ and $B_1'$. In addition there is the rotary motion of the spindle (34) itself, i.e. motion along the C-axis. Control of these motions by a numerical control means 35 is schematically illustrated in FIG. 4.

Depending on the application, all these motions can be present to a more or less considerable extent.

In particular, only the swivel device for rotation about the rotation axis (18) or the swivel device for rotation about the rotation axis 32 by means of the rotary table (31), will generally be available. This is indicated by the representation of the rotary table (31) shown in a broken line. A determining factor for the mobility of the spindle head is principally the swivel motion about the $B_1$-axis and also the longitudinal motion along the W-axis along the machine bed (22) of the spindle head. The further motion transversely to the W-axis along the $X_2$-axis and also, alternatively or in addition, the rotary motion about the $B_1'$-axis can be added.

It should be additionally noted that the main spindle of the spindle head is mounted hydrostatically or aerostatically. Separate drives are mainly used here for each motion sequence in order to dispense with resulting inaccuracies during gear shifts.

What is claimed is:

1. A universal turning machine comprising:
   a multi-track bed having first tracks and second tracks disposed substantially side-by-side with said first tracks, said multi-track bed comprising a spindle head machine bed having said first tracks thereon, said first tracks extending in a longitudinal direction in a bed plane;
   a spindle head having means for mounting a workpiece thereon, including a headstock means and a receiver means, rotatively mounted to said headstock means, for rotatively supporting a workpiece for rotation about a receiver axis, and having a center axis perpendicular to said bed plane, said spindle head being mounted on said first tracks for movement thereon in said longitudinal direction;
   indexing control means for controlling the angle of said receiver means about said receiver axis;
   an auxiliary machine bed having said second tracks thereon;
   a rest for mounting thereon working means which work the workpiece on said spindle head during rotation of the workpiece by said receiver means, said rest being mounted on said second tracks for movement therealong in opposite first directions, said spindle head machine bed and said spindle head therewith being pivotable in said bed plane about at least a swivel axis for adjusting the relative positions of the working means and the workpiece prior to working the workpiece with the working means, said swivel axis being perpendicular to said bed plane and parallel to and spaced from said center axis, said spindle head on said first tracks and said rest on said second tracks being movable past each other respectively in said longitudinal and first directions; and
   means for supporting said rest on said second tracks such that said rest is movable in second directions transverse to said first directions, said first and second directions being parallel to said bed plane;
   said spindle head being moveable on said first tracks and in pivotal movement with said spindle head machine bed in said bed plane about said swivel axis and said rest being movable in said first and second directions, all during rotation of the workpiece by said receiver means with the working means engaging the workpiece so as to work the workpiece, said spindle head being movable on said first tracks to a position where said swivel axis is spaced from said center axis a distance between approximately 100 cm and approximately 300 cm.

2. A turning machine as in claim 1, wherein said distance is approximately 200 cm.

3. A turning machine as in claim 1, wherein said center axis extends approximately through the center of gravity of said spindle head, and said spindle head is rotatable in said bed plane about said center axis, said headstock means comprising a headstock forming a covering for said spindle head, said turning machine further comprising a rotary table beneath said headstock means so as to rotatively support said spindle head on said spindle head machine bed for rotation in said bed plane about said center axis.

4. A turning machine as in claim 1, further comprising a compound slide, mounted on said spindle head machine bed for movement in said longitudinal direction and having means slidably supporting said spindle head thereon for movement in a direction relative to said slide transverse to said longitudinal direction.

5. A turning machine as in claim 1, further comprising a rack and pinion drive means for driving said spindle head machine bed and said spindle head therewith in pivotal movement in said bed plane about said swivel axis.

6. A turning machine as in claim 1, wherein said spindle head has a spindle and said turning machine further comprising a direct motor drive means for rotatively driving said spindle without the imposition of a gear drive.

7. A turning machine as in claim 1, further comprising means, interposed between said plurality of tracks and said rest, for slidably moving said rest in said first directions, opposite second directions transverse to said first directions, opposite third directions perpendicular to said first and second directions, and in rotation about an axis parallel to said third directions.

8. A turning machine as in claim 7, wherein said rest includes at least one mounting fixture for detachably fixing a working means for one of turning, grinding milling, boring or measuring the workpiece.

9. A turning machine as in claim 1, wherein said spindle head machine bed and said spindle head therewith are pivotable relative to said rest about said swivel axis between an angle of −10 degrees and an angle of 90 degrees, in relation to a position of said spindle head machine bed in which said longitudinal direction and said first directions are parallel.

10. A turning machine as in claim 1, wherein said spindle head machine bed and said spindle head therewith are pivotable relative to said rest about said swivel axis between an angle of −5 degrees and an angle of 30 degrees, in relation to a position of said spindle head machine bed in which said longitudinal direction and said first directions are parallel.

11. A turning machine as in claim 1, further comprising a compound slide and a machine terret mounting said rest on said plurality of tracks so that said rest is movable through said slide in said first directions and second directions transverse to said first directions, in a rest plane parallel to said bed plane, and so that said rest is movable in a direction perpendicular to said rest plane through said machine terret.

12. A universal turning machine, comprising:
   a spindle head machine bed having first tracks extending in a first longitudinal direction in a bed plane;

a spindle head having means for mounting a workpiece thereon, including a headstock means and a receiver means, rotatively mounted to said headstock means, for rotatively supporting a workpiece for rotation about a receiver axis, and having a center axis perpendicular to said bed plane, said spindle head being mounted on said first tracks for movement thereon in said first longitudinal direction;

indexing control means for controlling the angle of said receiver means about said receiver axis;

an auxiliary machine bed having second tracks extending in a second longitudinal direction parallel to said bed plane, said auxiliary machine bed being disposed adjacent said spindle head machine bed;

a rest for mounting thereon working means which work the workpiece on said spindle head during rotation of the workpiece by said receiver means, said rest being mounted on said second tracks for movement therealong in said second longitudinal direction, said spindle head machine bed and said spindle head therewith being pivotable in said bed plane about at least a swivel axis for adjusting the relative positions of the working means and the workpiece prior to working the workpiece with the working means, said swivel axis being perpendicular to said bed plane and parallel to and spaced from said center axis, said spindle head machine bed being pivotable about said swivel axis between a first position in which said second tracks are side-by-side with and approximately parallel to said first tracks and a second position angularly spaced from said first position, said spindle head on said first tracks and said rest on said second tracks being movable past each other respectively in said first and second longitudinal directions;

means for supporting said rest on said second tracks such that said rest is movable in opposite directions transverse to said second longitudinal direction, said transverse directions and said longitudinal direction being parallel to said bed plane; and numerical control means for numerically controlling movement of said spindle head longitudinally on said first tracks and pivotally with said spindle head machine bed in said bed plane about said swivel axis and movement of said rest in said transverse directions and said second longitudinal direction, all during rotation of the workpiece by said receiver means with the working means engaging the workpiece so as to work the workpiece, said spindle head being movable on said first tracks to a position where said swivel axis is spaced from said center axis a distance between approximately 100 cm and approximately 300 cm.

13. A universal turning machine comprising:

a spindle head machine bed having first tracks extending in a first longitudinal direction in a bed plane;

a spindle head having means for mounting a workpiece thereon, including a headstock means and a receiver means, rotatively mounted to said headstock means, for rotatively supporting a workpiece for rotation about a receiver axis, and having a center axis perpendicular to said bed plane, said spindle head being mounted on said first tracks for movement thereon in said first longitudinal direction;

indexing control means for controlling the angle of said receiver means about said receiver axis;

an auxiliary machine bed having second tracks extending in a second longitudinal direction parallel to said bed plane, said auxiliary machine bed being disposed adjacent to said spindle head machine bed;

a rest for mounting thereon working means which work the workpiece on said spindle head during rotation of the workpiece by said receiver means, said rest being mounted on said second tracks for movement therealong in said second longitudinal direction and movement perpendicular to bed plane, said spindle head machine bed and said spindle head therewith being pivotable in said bed plane about at least a swivel axis for adjusting the relative positions of the working means and the workpiece prior to working the workpiece with the working means, said swivel axis being perpendicular to said bed plane and parallel to and spaced from said center axis, said spindle head machine bed being pivotable about said swivel axis between a first position in which said second tracks are side-by-side with and approximately parallel to said first tracks and a second position angularly spaced from said first position, said spindle head on said first tracks and said rest on said second tracks being moveable past each other respectively in said first and second longitudinal directions;

means for supporting said rest on said second tracks such that said rest is movable in opposition directions perpendicular to said bed plane and opposite directions transverse to said second longitudinal direction, said transverse directions and said second longitudinal direction being parallel to said bed plane; and numerical control means for numerically controlling movement of said spindle head longitudinally on said first tracks and pivotally with said spindle head machine bed in said bed plane about said swivel axis and movement of said rest in said transverse direction, the direction perpendicular to said bed plane and said second longitudinal direction, all during rotation of the workpiece by said receiver means with the working means engaging the workpiece so as to work the workpiece, said spindle head being movable on said first tracks to a position where said swivel axis is spaced from said center axis a distance between approximately 100 cm and approximately 300 cm.

* * * * *